US009863399B2

(12) United States Patent
Siegfriedsen

(10) Patent No.: US 9,863,399 B2
(45) Date of Patent: Jan. 9, 2018

(54) TRANSMISSION/GENERATOR COUPLING

(75) Inventor: Sonke Siegfriedsen, Rendsburg (DE)

(73) Assignee: CENTA-ANTRIEBE KIRSCHEY GMBH, Haan (DE)

( * ) Notice: Subject to any disclaimer, the term of this patent is extended or adjusted under 35 U.S.C. 154(b) by 1006 days.

(21) Appl. No.: 13/995,792

(22) PCT Filed: Dec. 22, 2011

(86) PCT No.: PCT/DE2011/002166
§ 371 (c)(1),
(2), (4) Date: Jun. 19, 2013

(87) PCT Pub. No.: WO2012/083931
PCT Pub. Date: Jun. 28, 2012

(65) Prior Publication Data
US 2013/0268133 A1 Oct. 10, 2013

(30) Foreign Application Priority Data

Dec. 24, 2010 (DE) .................. 10 2010 055 876

(51) Int. Cl.
| F16D 7/02 | (2006.01) |
|---|---|
| F03D 7/02 | (2006.01) |
| F03D 17/00 | (2016.01) |
| F03D 15/00 | (2016.01) |
| F16H 1/28 | (2006.01) |

(52) U.S. Cl.
CPC ........... *F03D 7/0244* (2013.01); *F03D 15/00* (2016.05); *F03D 17/00* (2016.05); *F16D 7/02* (2013.01); *F05B 2240/61* (2013.01); *F05B 2260/4023* (2013.01); *F16H 1/28* (2013.01); *Y02E 10/72* (2013.01)

(58) Field of Classification Search
CPC .... F03D 7/0244; F03D 17/00; F05B 2240/61; Y02E 10/775; Y02E 10/722; F16H 1/28
See application file for complete search history.

(56) References Cited

U.S. PATENT DOCUMENTS

| 8,405,243 B2 * | 3/2013 | Siegfriedsen | ........... F03D 80/70 290/55 |
|---|---|---|---|
| 2009/0162202 A1* | 6/2009 | Nies | ........................ F03D 1/003 416/147 |
| 2009/0243295 A1* | 10/2009 | Kammer | ............... F03D 7/0224 290/44 |

(Continued)

FOREIGN PATENT DOCUMENTS

| AT | 508155 A4 * | 11/2010 | ............. F16H 3/724 |
|---|---|---|---|
| CN | 202082052 | 12/2011 | |

(Continued)

*Primary Examiner* — Stacey Fluhart
(74) *Attorney, Agent, or Firm* — Diederiks & Whitelaw, PLC

(57) ABSTRACT

A wind turbine, including a transmission, a transmission shaft acting as transmission output, a generator, a generator shaft acting as generator drive and a coupling connecting the transmission shaft and the generator shaft to one another, is characterized in that the generator shaft is designed as a hollow shaft, the coupling is disposed such that the coupling is connected to the generator shaft on the side of the generator facing away from the transmission, and the transmission shaft passes through the generator shaft and is connected to the coupling.

18 Claims, 1 Drawing Sheet

(56) References Cited

U.S. PATENT DOCUMENTS

| | | | | |
|---|---|---|---|---|
| 2011/0156405 A1* | 6/2011 | Holm | ................... | F03D 7/0244 |
| | | | | 290/55 |
| 2011/0171022 A1* | 7/2011 | Behnke | ................ | F03D 7/0204 |
| | | | | 416/1 |
| 2011/0187108 A1* | 8/2011 | Wakasa | ................ | F03D 7/0224 |
| | | | | 290/44 |
| 2012/0059638 A1* | 3/2012 | Garate lvaro | ......... | F03D 7/0224 |
| | | | | 703/9 |
| 2012/0063902 A1* | 3/2012 | Heenberger | ............ | F16H 3/724 |
| | | | | 416/170 R |

FOREIGN PATENT DOCUMENTS

| | | |
|---|---|---|
| DE | 202010012659 | 12/2010 |
| EP | 811764 | 12/1997 |
| EP | 2216547 | 8/2010 |
| WO | WO 2008/113318 | 9/2008 |

\* cited by examiner

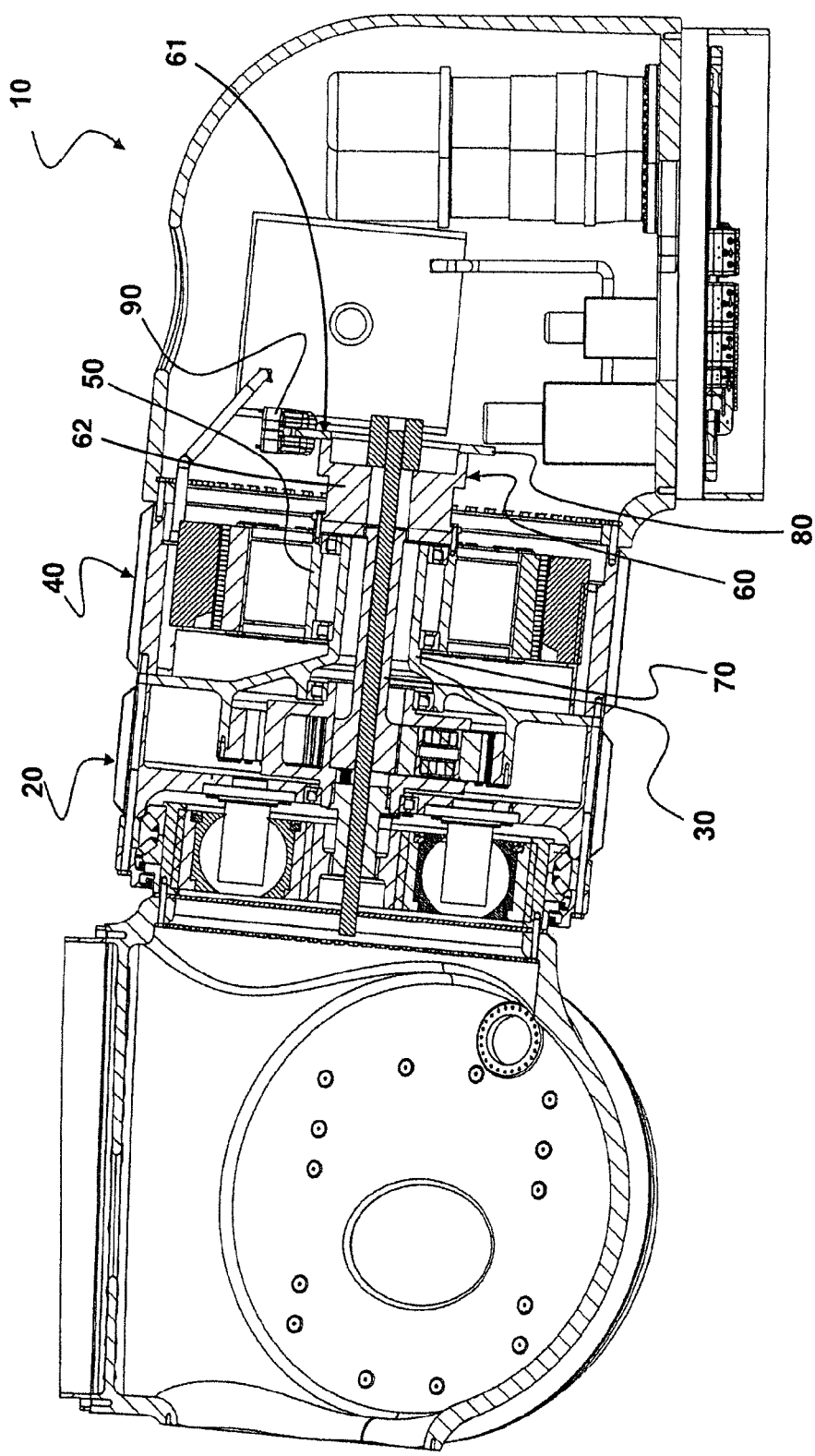

TRANSMISSION/GENERATOR COUPLING

CROSS-REFERENCE TO RELATED APPLICATIONS

This application represents a National Stage application of PCT/DE2011/002166 entitled "Transmission/Generator Coupling" filed Dec. 22, 2011, pending.

BACKGROUND OF THE INVENTION

The invention relates to a coupling, suitable for use with wind turbines, for connecting the output of a transmission to the drive of a generator.

A coupling of this type is for example known from KTR Kupplungstechnik GmbH that is traded under the name RADEX®-N and that connects the transmission shaft to the generator shaft by means of an adapter manufactured from a glass-reinforced plastic. In addition, this coupling exhibits a sensor disk for speed monitoring, a torque-limiting system designed as a slip hub for protecting the transmission from generator-side load peaks and a transmission-side brake disk.

However due to the arrangement of the adapter between the transmission shaft and the generator shaft, this type of coupling requires relatively much space which runs counter to a compact design of a wind turbine that is increasingly asked for.

Over and above this, the installation of the coupling, in particular aligning the transmission and the generator or the transmission shaft and the generator shaft relative to each other, is very labor intensive and liable to faults, it being possible for a misalignment of the transmission shaft to the generator shaft to lead to an increased load of the bearing in the transmission and the generator. Although the transmission shaft and the generator shaft are connected to the coupling in a very simple manner by means of clamp rings, it is still necessary to adjust the distance of transmission and generator or transmission shaft and generator shaft, in particular the alignment of the axes during standstill and under load, in each case such that an optimum connection of the coupling to the transmission shaft and the generator shaft can be achieved.

SUMMARY OF THE INVENTION

It is therefore the objective of the present invention to provide a wind turbine having a coupling for connecting the output of a transmission to the drive of a generator, that is to say for connecting the transmission shaft to the generator shaft, that can be set up in a less labor-intensive manner and exhibits a more compact design compared to the state of the art.

The basic idea of the invention is to arrange the coupling not spatially between the transmission and the generator, but to connect the transmission shaft and the generator shaft to each other on the side of the generator facing away from the transmission. As a result, transmission and generator can be arranged very close to each other and the wind turbine can be constructed in a very compact manner.

In the process it is also possible to implement—as is known from the prior art—speed monitoring, torque limiting and a brake disk for braking the transmission shaft. These constructive measures require only little space, the arrangement behind the generator when viewed from the rotor also being easy to access and thus very easy to maintain.

Finally it is a great advantage that in the case of the inventive arrangement the machinery train can be established in a linear fashion, that is from one side to the other side, preferably from the side of the rotor bearing up to the side of the generator without any change in the relative position of the components relative to each other having to take place. On account of the concentric construction, the alignment of the components results automatically without necessitating expensive matching processes.

The inventive arrangement is finally particularly simple also because a separate bearing of the drive output shaft can be dispensed with since it is supported by the generator bearing via the coupling.

BRIEF DESCRIPTION OF THE DRAWINGS

The invention is explained in more detail with reference to an exemplary embodiment of particular design that is shown in the attached drawing.

FIG. 1 shows a section through an SCD® wind turbine in the area of the nacelle designed as a head support.

The wind turbine that is shown as a preferred exemplary embodiment essentially shows the construction known from WO 2008/113318 A2 so that reference is made to the pre-published document for components not directly belonging to the present invention. Incidentally, the present invention is not limited in its use to the already known wind turbines but can be used in any wind turbine—in the SCD wind turbine that is shown it is simply advantageous on account of the rather limited space requirement and the advantages mentioned further above.

The wind turbine 10 of preferred design exhibits a two-stage planetary transmission 20 having a transmission shaft 30 that acts as a transmission output and a generator 40 having a generator shaft 50 acting as generator drive.

According to the invention, the coupling 60 for connecting the transmission output shaft 30 to the generator drive shaft 50 is arranged on the side of the generator 40 opposite the transmission 20. So that now a connection between the transmission shaft 30 and the generator shaft 50 is made possible, the generator shaft 50 is designed as a hollow shaft so that the transmission shaft 30 can be guided through the generator shaft 50 and thus through the generator 40 from the side facing the transmission 20 to the side of the generator 40 facing away from the transmission 20.

In this way, the coupling 60 can be connected on the side of the generator 40 facing away from the transmission 20, on the one hand easily to the transmission shaft 30 and on the other hand to the transmission shaft 30 passing through the generator shaft 50 for example by means of a clamp ring. The rotor of the generator 40 is also regarded as a generator shaft 50 so that the coupling 60 can be connected also directly to the rotor of the generator 40.

In this development, no separate bearing of the transmission shaft 30 is necessary since the transmission shaft 30, on account of the connection to the coupling 60, is jointly supported with the generator shaft 50 in their bearings.

In particular a stationary hollow journal 70 is provided on whose outside two bearings for supporting the generator shaft 50 (or the rotor of the generator 40) are provided, whereas the output shaft 30 of the transmission 20 is guided in the hollow space of the journal 70. The generator shaft 50 can likewise also be supported in the journal 70 in case the journal 70 is designed as part of the housing. At the same time, it is also the transmission shaft 30 that can be designed as a hollow shaft for receiving, for example in the rear area of the head support, supply lines leading into the hub of the wind turbine 10.

Furthermore the coupling 60 is preferably designed as a slip coupling for protecting the transmission 20 against brief high moments, for example in the case of a generator short circuit. The slip coupling 60 very preferably exhibits a sensor that detects a slipping of the coupling 60, for example a position measuring device—the sensor thus detects a relative movement, occurring at the slip coupling, of the transmission shaft 30 to the generator shaft 50. Most preferably the sensor not only detects a slipping, but also the slip angle for each slip process.

On top of this the wind turbine 10 is provided with a data processing device connected to the sensor that logs the slipping and, where applicable, reports it to a central point for monitoring the wind turbine 10. For example frequent occurrence of slipping movements at the coupling 60 during a certain period and/or a particularly large slip angle for each slip process can signal that the slip coupling 60 has to be readjusted and/or that the turbine 10 is generally in need of maintenance. In the process also reports classified according to priority can be envisaged that can be marked using different colors, for example yellow or red, to give the operator of the wind turbine a fast overview of the most important reports so that the necessary measures can be taken for fault-free operation or to be able to return to the fault-free operation again. So for example the operator or preferably the data-processing device itself can reduce the power of the wind turbine, preferably in stages of in each case 20%, or even turn it off, so as to avoid too frequent slipping and thus wear until the time of the next maintenance.

Finally that coupling part 61 that is connected to the transmission shaft 30 exhibits a brake disk 80 that cooperates with a disk brake 90, the slip element of the coupling 60 being arranged between that coupling part 61 that is connected to the transmission shaft 30 and that coupling part 62 that is connected to the generator shaft 50. As a result, the disk brake 90 can act directly on the transmission shaft 30, bypassing the slip coupling 60, and the wind turbine 10 can be braked completely.

The invention claimed is:

1. A wind turbine comprising:
a transmission,
a transmission shaft acting as a transmission output,
a generator,
a generator shaft acting as a generator drive, and
a coupling connecting the transmission shaft and the generator shaft to one other, wherein
the generator shaft is a hollow shaft,
the coupling is connected to the generator shaft on a side of the generator facing away from the transmission and constitutes a slip coupling, and
the transmission shaft passes through the generator shaft and is connected to the coupling,
characterized in that a coupling part connected to the transmission shaft constitutes a brake disk cooperating with a disk brake, a slip connection for the coupling being arranged between the coupling part connected to the transmission shaft and another coupling part connected to the generator shaft.

2. The wind turbine according to claim 1, characterized in that the generator shaft is supported on a journal that is arranged concentrically inside the generator shaft, the journal being of hollow design and the transmission shaft being guided through a hollow space of the journal.

3. The wind turbine according to claim 2, characterized in that the transmission shaft is supported by means of the coupling in a generator shaft bearing as a result of a connection of the transmission shaft to the generator shaft.

4. The wind turbine according to claim 2, characterized by a sensor detecting a slipping of the coupling.

5. The wind turbine according to claim 2, characterized by a sensor for detecting a slip angle for each slip process.

6. The wind turbine according to claim 1, characterized in that the transmission shaft is supported by means of the coupling in a generator shaft bearing as a result of a connection of the transmission shaft to the generator shaft.

7. The wind turbine according to claim 6, characterized by a sensor detecting a slipping of the coupling.

8. The wind turbine according to claim 6, characterized by a sensor for detecting a slip angle for each slip process.

9. The wind turbine according to claim 1, characterized by a sensor detecting a slipping of the coupling.

10. The wind turbine according to claim 9, characterized by a data processing device connected to the sensor for outputting a warning signal when a predetermined detected slipped frequency and/or a predetermined detected slip angle are exceeded.

11. The wind turbine according to claim 10, characterized in that the data processing device triggers a power reduction or a switching-off of the turbine.

12. The wind turbine according to claim 9, characterized by a sensor for detecting a slip angle for each slip process.

13. The wind turbine according to claim 1, characterized by a sensor for detecting a slip angle for each slip process.

14. The wind turbine according to claim 13, characterized by a data processing device connected to the sensor for outputting a warning signal when a predetermined detected slipped frequency and/or a predetermined detected slip angle are exceeded.

15. A wind turbine comprising:
a generator including a hollow generator shaft establishing a generator drive;
a transmission including a transmission shaft establishing a transmission output, said transmission shaft extending through the generator shaft;
a coupling connecting the transmission shaft and the generator shaft, said coupling constituting a slip coupling which enables relative rotation between the transmission shaft and the generator shaft, said coupling including a first coupling part connected for co-rotation to the transmission shaft and a second coupling part connected for co-rotation to the generator shaft, said first coupling part including a brake disk; and
a disk brake for engaging the brake disk to selectively limit rotation of both the brake disk and the transmission shaft, while still enabling relative rotation between the transmission shaft and the generator shaft through the slip coupling.

16. The wind turbine of claim 15, wherein the coupling is located on a side of the generator facing away from the transmission.

17. A coupling configured to connect a hollow, generator shaft and a transmission shaft, which extends through the hollow, generator shaft, of a wind turbine, said coupling comprising: a first coupling part configured to be connected to the transmission shaft, a second coupling part configured to be coupled to the generator shaft, a brake disk arranged on the first coupling part, and a disk brake configured to limit rotation of the brake disk while the coupling establishes a slip coupling configured to permit relative rotation between the transmission shaft and the generator shaft.

18. The coupling of claim 17, wherein the first and second coupling parts are located on a side of a generator having the generator shaft facing away from a transmission having the transmission shaft.

\* \* \* \* \*